Figure 1:
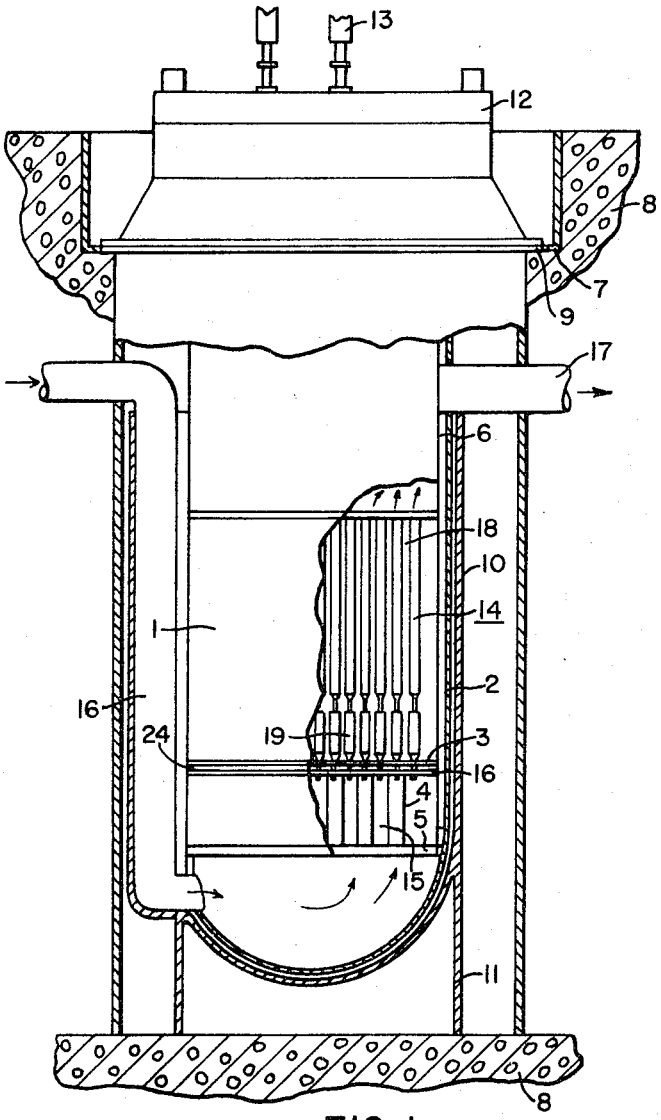
Figure 2:
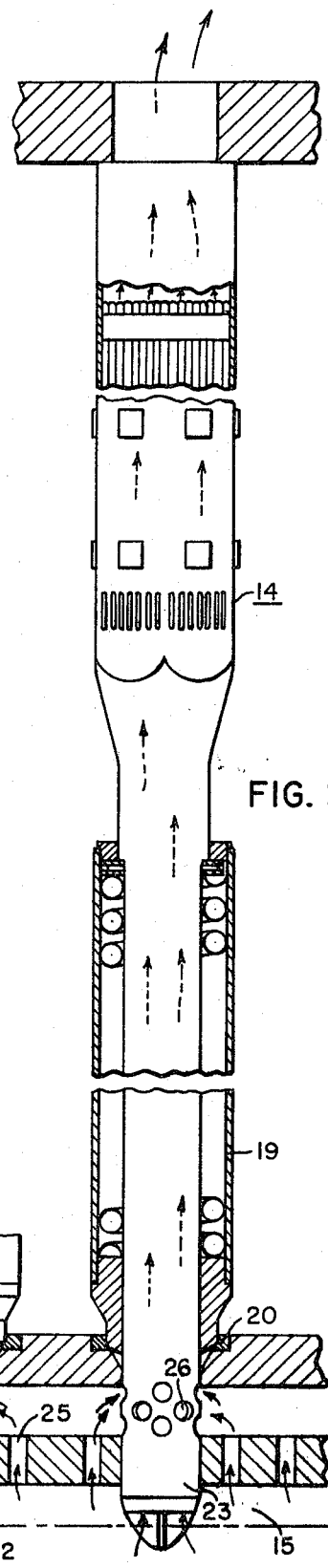
Figure 3:
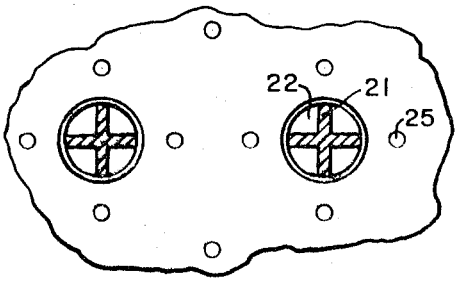

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 17, 1973

909 O.G. 795

T909,019

NUCLEAR CORE INLET FLOW ARRANGEMENT

John F. Patterson, Jr., Murrysville, Pa., assignor to Westinghouse Electric Corporation, Pittsburgh, Pa.

Filed June 13, 1972, Ser. No. 262,434
Int. Cl. G21c *15/22, 15/24, 19/28*
U.S. Cl. 176—61
1 Sheet Drawing. 11 Pages Specification

A nuclear core arrangement for admitting reactor coolant into nuclear reactor fuel assemblies. Inlet nozzles having main and alternate inlets are attached to the fuel assemblies. Each of the nozzle inlets receive reactor coolant from a separate flow plenum. The flow plenums are arranged in parallel and are separated by a perforated sealing member. Should the main inlet to the fuel assembly become clogged by debris, the alternate inlet supplies the fuel assembly with reactor coolant.

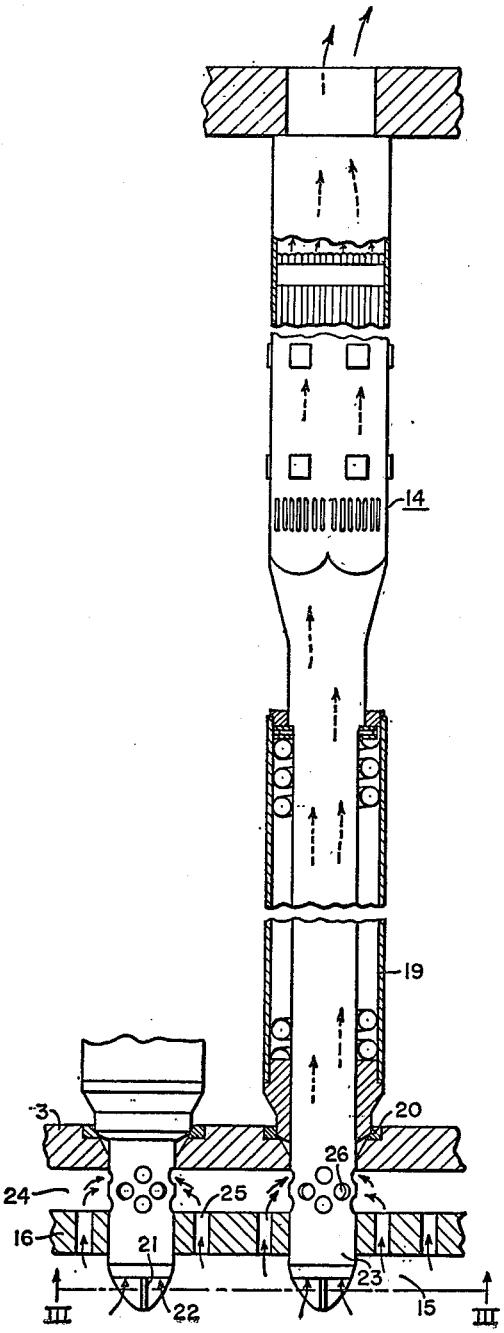

NUCLEAR CORE INLET FLOW ARRANGEMENT

Filed June 13, 1972